Figure 1:
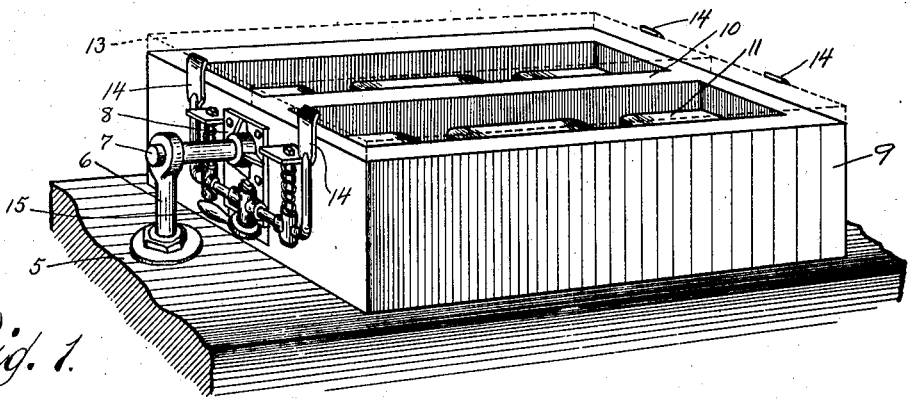

Feb. 23, 1926. 1,574,565
J. A. FERGUSON
APPARATUS FOR MOLDING BUILDING BLOCKS
Filed August 8, 1921 2 Sheets-Sheet 1

WITNESS.
John B. Cade.

INVENTOR.
John A. Ferguson
by Wilkinson & Fry
his ATTORNEYS.

Feb. 23, 1926.
J. A. FERGUSON
1,574,565

APPARATUS FOR MOLDING BUILDING BLOCKS

Filed August 8, 1921
2 Sheets-Sheet 2

WITNESS.
John B. Hade.

INVENTOR.
John A. Ferguson.
by Wilkinson & Fisher
his ATTORNEYS.

Patented Feb. 23, 1926.

1,574,565

UNITED STATES PATENT OFFICE.

JOHN A. FERGUSON, OF ORANGE PARK, FLORIDA.

APPARATUS FOR MOLDING BUILDING BLOCKS.

Application filed August 8, 1921. Serial No. 490,675.

*To all whom it may concern:*

Be it known that I, JOHN A. FERGUSON, a citizen of the United States, formerly residing at the city and county of Denver and State of Colorado, and now a resident of Orange Park, in the county of Clay and State of Florida, have invented certain new and useful Improvements in Apparatus for Molding Building Blocks; and I do hereby declare the following to be a full, clear, and exact description of the invention, such as will enable others skilled in the art to which it appertains to make and use the same.

This invention relates to improvements in apparatus for molding building blocks, or analogous articles, formed from a wet cementitious mixture.

While the invention has been devised primarily for the purpose of manufacturing concrete building blocks with lateral lugs or projections, it will be understood that I employ the term "concrete" in the sense of including building blocks of equivalent or analogous composite material and of any appropriate formation, and whether or not they are to be formed with a facing surface such as marble, granite, sand or otherwise, as is now quite a common practice in this art.

It is now generally recognized that better results are obtained when water is added to the cementitious mixture in sufficient quantity to provide a highly saturated or quaky wet mass, whereby there is assured a more consolidated or solidified impervious block.

With machines as sometimes heretofore employed, for molding such types of concrete building blocks, there has arisen the serious objection that there is formed in the quaky wet mixture larger or smaller interstices, caused by improper settling and air bubbles, which to a certain extent destroy the maximum cohesion of the molecular particles of the mass, and hence result in blocks that are very porous, absorptive and otherwise defectively weak.

The primary aim of the present invention has been to devise a simplified apparatus for overcoming such objection, especially in the multiple molding of blocks in a single cycle of operations, by imparting to the contents of the molding compartments a pulsating or jerky settling motion, which may be referred to conveniently as "jigging" in the sense of either vertical or horizontal vibratory agitation.

Other objects and advantages will be clearly apparent as incidental to the following disclosure, and with these prefacing remarks reference will now be had to the accompanying drawings, illustrating certain practical embodiments of the improved apparatus, the two sheets of drawings showing substantially equivalent elements and operating mechanism but slightly differing in details of structure and the disposition of parts, and in which—

Figure 2:
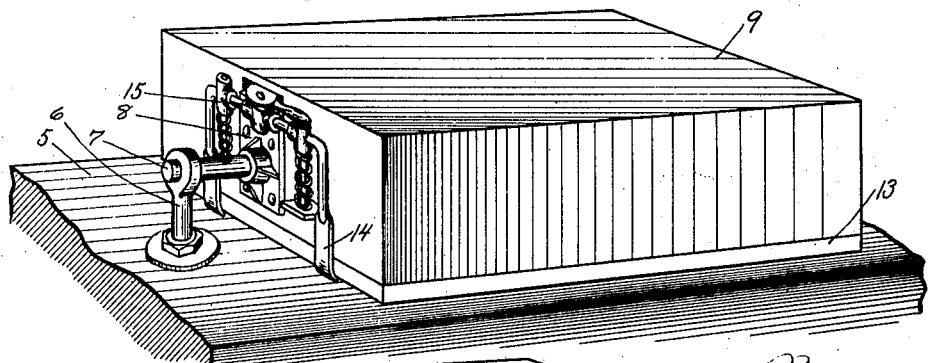
Figure 3:
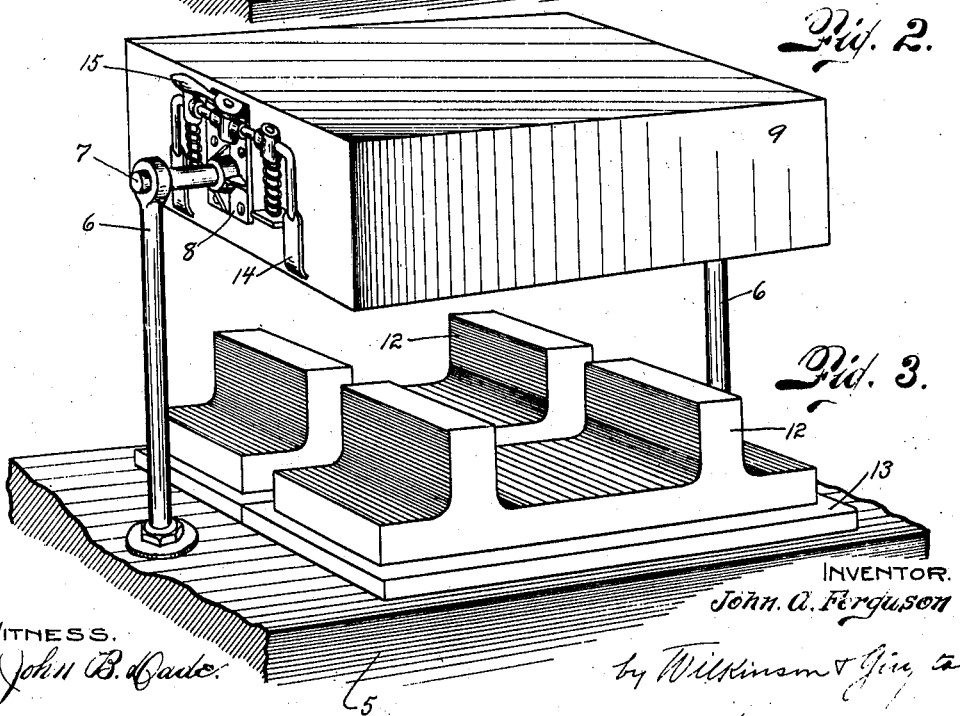
Figure 4:
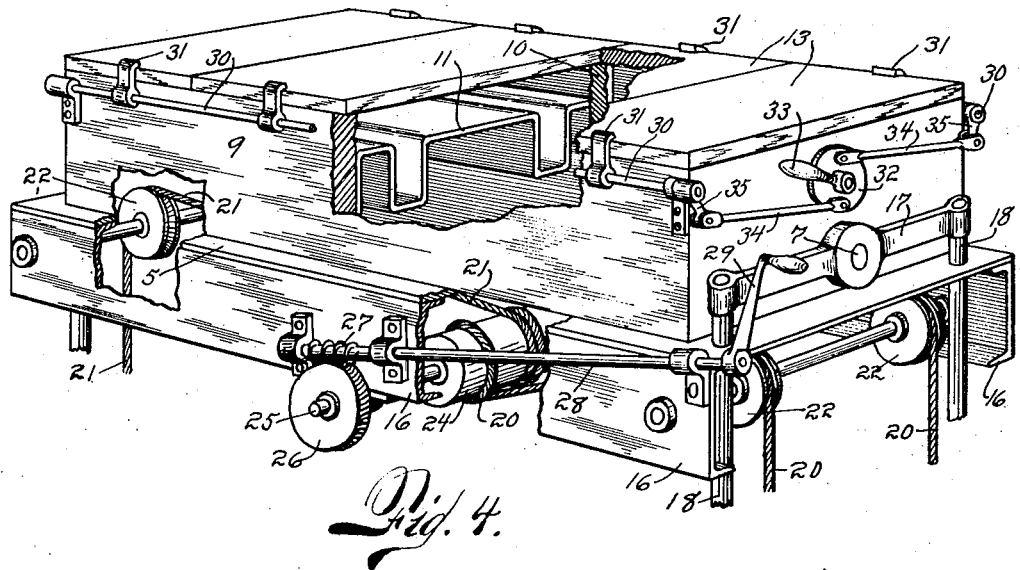
Figure 5:
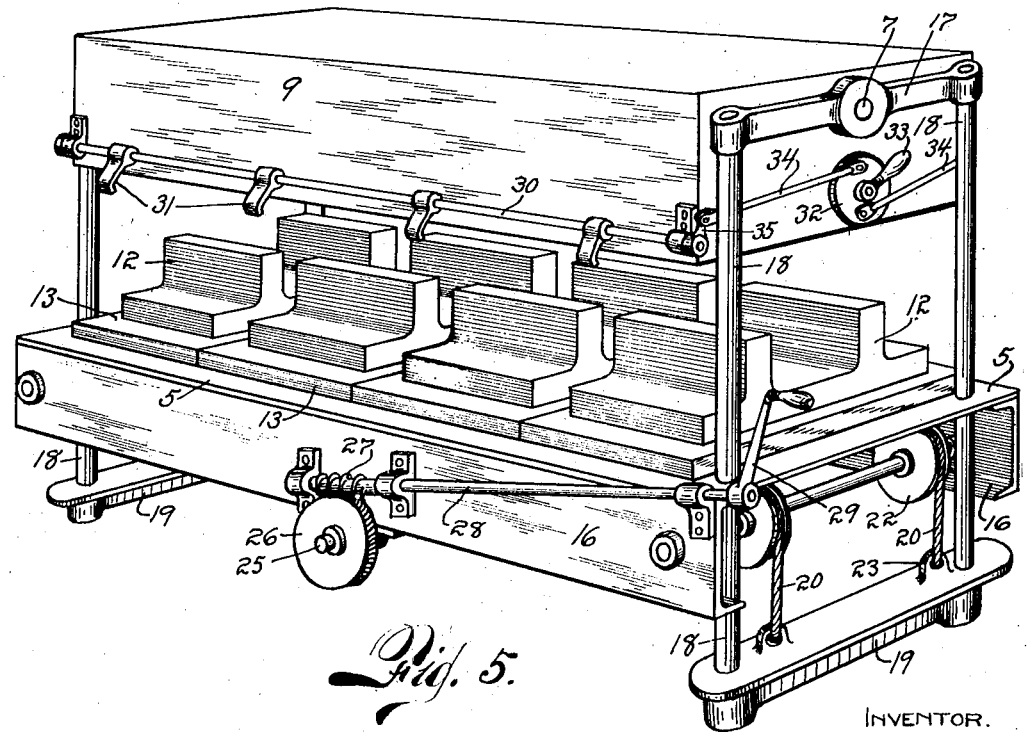

Figure 1 is a perspective view of a mold, in its initial or filling position, that provides a pair of molding compartments disposed longitudinally thereof, although in actual practice the number and disposition of the compartments are not essentially material, the mounting being such as to provide for vertical displacement with reference to a jigging support, whether a table or equivalent means, and the mechanism for jigging the latter not being illustrated as any well known means may be employed for that purpose; Figure 2 is a view analogous to Fig. 1, but with the mold shown in its inverted position on the jigging support; Figure 3 is a view analogous to Fig. 2, but with the mold shown in an elevated position and with the molded building blocks discharged therefrom; Figure 4 is a view substantially analogous to Fig. 1, in the initial position after filling, but illustrating a transverse arrangement of the molding compartments as well as other details, with portions of the structure broken away and with the cementitious mixture omitted from the mold form seen, to more clearly disclose the structure and arrangement of the latter; and Figure 5 is a view substantially analogous to Fig. 3 but with reference to the arrangement of Fig. 4.

Generically speaking the invention resides in the provision of a mold form container or containers, each having one or a plurality of molding compartments, associated with a jigging support to impart a jerky agitating motion thereto, for settling or consolidating the contents thereof, the said molding compartments providing an open side for filling purposes which is adapted to be covered by a pallet closure. This jigging is effected preferably both while the cementitious mixture is being introduced into its mold form container as well as when the filling operations have been completed, after which the mold form container is bodily turned over, specifically within its own zone, to be supported in a reversely inverted position on the same jigging support, so that its contents may be correspondingly jigged as thus inverted, for the important reasons hereinafter set forth.

Before entering into a more specific description, it may also be stated here that in employing herein any of the terms of mold form container, mold box, mold, or any such analogous expressions, the use thereof in the singular number is intended to apply equally as well in the plural sense, that is to say that there may be but one of such elements, whether having only one molding compartment or several, associated with its jigging support, or there may be several of such elements, whether each has only one or a plurality of molding compartments, although for convenience of description, and it is to be understood that it is for that purpose solely, the singular number is only generally employed herein.

The numeral 5 indicates a suitably supported jigging table or its equivalent which, as hereinbefore stated, may be jigged either vertically or horizontally, or with both motions for that matter, by any of the suitable mechanisms commonly employed for jigging purposes generally.

Also, any suitable means may be employed for mounting the mold box so that it may be bodily elevated and lowered with reference to the jigging table, and in Figs. 1 to 3 of the drawings there is illustrated broadly a simple mechanism comprising a single pair of vertically disposed rods 6, one at each end of the mold box, projecting upwardly through complementary apertures in the jigging table and rectilinearly actuated by any suitable means, not necessary to illustrate in these views for an understanding of the invention.

The upper end of each of the rods 6 provides means for trunnioning the mold box, for bodily turning over or reversible movements wholly within its own areal bounding limits, and these trunnioning means are conveniently indicated by a pair of axial stud shafts 7, each one of which is mounted by a supporting plate 8 that is centrally affixed to each end of the mold box.

The mold box itself is designated at 9, and in these views there is shown a central longitudinal partitioning wall 10 for dividing the mold box into two longitudinally disposed molding compartments that provide suitable core elements 11 for molding double lugged building blocks of the form shown at 12, although it will be obvious that replaceable core elements may be employed for molding other forms and sizes of blocks.

The numeral 13 indicates a cover or covers for the mold box, which may also serve as removable supporting means for the molded blocks as hereinafter referred to, and I conveniently refer to this cover, or covers as the case may be, by the term "platen" or "pallet".

Any suitable means may be employed for detachably securing or clamping the pallet cover or covers to the open top of the mold box, and I have simply illustrated conventionally a type of such securing means as comprising a pair of springy arms or clasp elements 14 that are suitably supported by the mold box and manually operated by a lever 15. One of these latching devices is mounted at each end of the mold box, and in the drawings I have shown one of the clamps 14 as engaging over the pallet 13 at each end thereof, there being two such pallets indicated at Figures 1 and 3, although it will be obvious that the cover may be an integral one to jointly support a pair of the molded blocks instead of supporting them individually, if so desired. These details are not necessarily essential in their specific forms, to the broader invention involved, and require no further description for a proper understanding of the real essence of the invention.

In the arrangement shown at Figures 4 and 5, the jigging support is indicated by the top 5 supported by side channel bars 16. The mold box 9, having the pallet covers 13, is at its ends trunnioned, as at 7, to the upper transverse end bars 17, which latter are respectively mounted by the upper ends of paired vertical supporting rods 18, that freely operate rectilinearly through complementary apertures in the table top, and the other ends of these vertical rods 18 are fixedly supported by the lower or base transverse end bars 19. These base bars 19 are in turn suspended by pairs of cables 20—21, that reave over suitably journaled idler sheaves 22, being attached at their outer ends to eyelet lugs 23, of the base bars 19, and at their inner ends being operatively associated with winding means. The winding means is conventionally illustrated by a centrally disposed roller or drum element 24, suspended from the channel side bars 16 by the journaled shaft ends 25, one of which latter is projected beyond its channel bar 16 and carries a worm wheel 26 operated by the worm 27 on the shaft 28, rotated by a crank arm 29. Obviously, however, it would be equivalent to employ proper sheave elements, mounted on a cross shaft, instead of the actual roller or drum 24 illustrated, and likewise actuating means other than the specific worm wheel and worm may be employed.

Also, it will be observed that, in Figures 4 and 5, the molding compartments, and their core elements 11, are disposed transversely of the mold box, instead of longitudinally thereof as in Figures 1 to 3, the compartments being separated by a plurality of transverse partitioning walls 10, and hence the form and arrangement of the latching means for the cover or pallets have been accordingly altered to provide for the slightly changed conditions.

Along each longitudinal face of the mold box, therefore, contiguously of its open top, there is now disposed a rock shaft 30 mounting a plurality of short latching arms or clamps 31, suitably spaced therealong and there being at least one of such elements 31 for each end of each pallet cover 13, as will be apparent, and these rock shafts 30 may be oscillated to latch or unlatch the clamp elements 31, with relation to the pallet covers 13 and as a conjoint operation, by the simple arrangement illustrated in these figures, comprising a member 32 rotatably mounted on an end of the mold box and providing an operating handle or lever arm 33, to which rotatable member 32 there are pivotally connected, at diametrically opposite positions, the inner ends of oppositely projected link arms or rods 34, while the outer ends of said rods 34 are pivotally connected to short lever arms 35 carried by complementary ends of the rock shafts 30. Obviously the elements 32—33—34—35 may be duplicated at the other end of the mold box, for convenience of operations at either end, but this would not appear to be essentially necessary.

In carrying forward the steps of operations, and referring particularly to Figures 4 and 5 which are more complete in all details and from which the operations of Figures 1 to 3 will be equally apparent, the mold box 9 is first positioned on the jigging table 5, or its equivalent, with its open top disposed upwardly, as would be indicated at Figs. 1 and 4, but with the pallet covers 13 removed and with the clamping arms 14 or 31 operated to their unlatched positions.

The molding compartments are then filled with the cementitious mixture, the filling thereof occurring while the table or its equivalent is being jigged, for thus distributing the mixture evenly within the molding compartments. After this initial step, and whether or not a facing material is added as will hereinafter appear, the pallet covers 13 are then placed over the open tops of the compartments and securely clamped down thereover by the aforesaid clamping arms in the manner before referred to.

As thus filled, covered and disposed, the jigging support is then again actuated with its jerky agitating motion for a substantially suitable period of time, so that the quaky contents of the molding compartments become more and more consolidated therein as the excess water and air bubbles are caused to escape.

After a suitable length of time the actuation of the jigging support may be temporarily suspended, whereupon the mold box is bodily elevated away from the jigging support, as by means of the mechanism 17 to 29 inclusive, and while so elevated it is revolved on its trunnions, and hence wholly within its own areal bounding limits, through an angle of 180°, being then lowered to be supported or reseated in an inverted position but occupying the same identical space as initially on the jigging support or with the pallets 13 now resting on the jigging support, as would be indicated for instance at Fig. 2. It is to be particularly noted, however, that as thus reseated, in its inverted secondary position, the mold box occupies the same identical space as when in its initial position, and this as contradistinguished from having been bodily moved to another position, along the apparatus, substantially distant from its original position, or even as swung over to a less distant position by means of a hinging connection or support. When the mold box is thus supported in its secondary position, the jigging support is again actuated as heretofore described for causing a further jerky motion to the contents of the molding compartments in their inverted positions, which will obviously insure a thorough consolidation of the contents thereof. This will also be true where a facing material has been inserted in the mold compartments over the body of the mixture, as hereinafter referred to, the facing material becoming likewise consolidated with the body material of the block proper, and any excess water in the facing mixture will have been substantially exuded.

This final operation having been completed and the jigging motion of the table or its equivalent having been stopped, it now only remains to actuate the operating lever 15 or 33 as the case may be to release the latching clamps, whereupon the mold box 9 is again bodily elevated, by the mechanism before described, to the position shown at Figure 3 or 5, leaving the molded blocks 12 released from their molding compartments and cores and resting on their respective pallets 13, which latter now serve as convenient supports for setting the molded blocks aside until they have become thoroughly indurated for commercial use.

It may be further said that this final jigging is also of considerable importance inasmuch as it loosens the ends of the webs of the blocks, making it more feasible to release the molded blocks and discharge them by gravity, as without this final jigging there might be a decided tendency towards the ends of the webs sticking to and being held in the mold forms, making it necessary to jar or jolt the mold box to start the release of the blocks, and prevent the ends of the webs from remaining in their compartments as the bodies thereof are being discharged.

When the pallets with their molded blocks have been removed from the jigging support, and with the mold box elevated as at Figure 3 or 5, the mold box is again turned through an angle of 180°, and hence wholly within its own areal bounding limits, when it is then lowered to its initial position, as indicated at Figure 1 or 4, whereupon the cycle of operations may be repeated by the employment of a new set of pallet covers, and thus carried on for an indefinite number of times.

I have described all of the foregoing with more particular reference to the molding of blocks that are not intended to have a finished facing of granite, marble or other material as before referred to, although in actual practice the latter may generally be employed, but it will be obvious that where such a facing is desired it will only be necessary to fill the mold compartments to a limited height or, which is the equivalent, a portion of their contents may be removed with a suitable scraping implement, after the initial filling and jigging operations, whereupon the spaces left interiorly of the top of the molding compartments are filled with the facing material before the molds are reversed for the final jigging, which latter causes the consolidation of the face matter with the body matter of the block, as has already been mentioned.

In all cases the steps of the operations are practically identical, and it is understood that my invention is intended to be applicable in all such relations.

While I have thus fully set forth my invention, it will be understood, however, that I do not wish to unnecessarily restrict myself to the exact details as disclosed, but what I do claim as new and patentable is:—

1. In apparatus for molding articles from a wet mixture, the combination of a suitably actuated jigging support, auxiliary supporting means associated therewith and adapted to be vertically actuated independently thereof, a mold form container separably carried by said jigging support, which mold form container has an enlarged top face opening and is so pivotally connected to said vertically actuated auxiliary supporting means as to be bodily invertible, for reseating wholly within its own normal areal bounding limits relatively to said jigging support, when bodily shifted to said auxiliary supporting means away from said jigging support, closure means for said enlarged opening, and means for detachably securing said closure means thereover.

2. In apparatus for molding building blocks from a wet cementitious mixture of the character disclosed, the combination of a suitably supported and actuated jigging table, supporting means associated with the top of said table and adapted to be vertically actuated independently thereof, an open top mold box separably carried by said table and so pivotally connected to said vertically actuated supporting means as to be bodily invertible, for reseating wholly within its own normal areal bounding limits relatively to said table, when elevated by said supporting means away from said table, pallet closure means for said mold box, and means for detachably securing said pallet closure means upon the open top of said mold box.

3. In apparatus for molding building blocks from a wet cementitious mixture of the character disclosed, the combination of a suitably supported and actuated jigging table, vertically disposed supports extending above said table and adapted to be rectilinearly actuated independently thereof, an open top mold box separably carried by said table and so pivotally mounted by said vertically disposed supports as to be bodily invertible, for reseating wholly within its own normal areal bounding limits relatively to said table, when elevated by said vertically disposed supports away from said table, pallet closure means for the open top of said mold box, and means for detachably securing said pallet closure means in place.

4. In apparatus for molding a plurality of building blocks in a single cycle of operations from a wet cementitious mixture of the character disclosed, the combination of a suitably supported and actuated jigging table, supporting means associated with said table and adapted to be actuated vertically above and independently of said table, a mold box separably carried by said table and so pivotally connected to said vertically actuated supporting means as to be bodily invertible, for reseating wholly within its own normal areal bounding limits relatively to said table, when elevated by said supporting means away from said table, the said mold box providing a plurality of molding compartments having normally open tops, pallet closure means for said open top compartments, and means for detachably securing said pallet closure means in place.

5. In apparatus for molding a plurality of building blocks in a single cycle of operations from a wet cementitious mixture of the character disclosed, the combination of a suitably supported and actuated jigging table, auxiliary means associated with and operable towards and away from said table, a mold box separably carried by said table and so pivotally mounted by said auxiliary means as to be bodily invertible, for reseating wholly within its own normal areal bounding limits relatively to said table, when moved by said auxiliary means away from said table, the said mold box providing a plurality of molding compartments having normally open tops, means for operating said auxiliary means relatively to said table, pallet closure means for said open top compartments, and means for detachably securing said pallet closure means in place.

6. In apparatus for molding a plurality of building blocks in a single cycle of operations from a wet cementitious mixture of the character disclosed, the combination of a suitably supported and actuated jigging table, auxiliary means associated with and operable towards and away from said table, a mold box separably carried by said table and so pivotally mounted by said auxiliary means as to be bodily invertible, for reseating wholly within its own normal areal bounding limits relatively to said table, when moved by said auxiliary means away from said table, the said mold box providing a plurality of molding compartments having normally open tops, pallet closure means for said open top compartments, means for detachably securing said pallet closure means in place, and means for operating said auxiliary means relatively to said table, embodying suitably actuated gearing elements operatively associated with said auxiliary supporting means.

7. In apparatus for molding a plurality of building blocks in a single cycle of operations from a wet cementitious mixture of the character disclosed, the combination of a suitably supported and actuated jigging table, auxiliary means associated with and operable towards and away from said table, a mold box separably carried by said table and so pivotally mounted by said auxiliary means as to be bodily invertible, relatively to said table, when moved by said auxiliary means away from said table, the said mold box providing a plurality of molding compartments having normally open tops, means for operating said auxiliary means relatively to said table, pallet closure means for said open top compartments, and means for detachably securing said pallet closure means in place, embodying lever operated clamping members mounted by said mold box adjacent to said open tops and adapted to clamp over the complementary ends of said pallet closure means.

In testimony whereof, I affix my signature.

JOHN A. FERGUSON.